US 6,625,923 B2

(12) United States Patent
Lee et al.

(10) Patent No.: US 6,625,923 B2
(45) Date of Patent: *Sep. 30, 2003

(54) BIODEGRADABLE PAPER-BASED AGRICULTURAL SUBSTRATE

(75) Inventors: Peter F. Lee, Wyckoff, NJ (US); Elizabeth C. Cornelius, New Windsor, NY (US); Prasad S. Potnis, Duluth, GA (US); Christopher S. Cleveland, Cincinnati, OH (US); Gary H. Knauf, Bear Creek, WI (US)

(73) Assignee: International Paper Company, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/784,987

(22) Filed: Feb. 15, 2001

(65) Prior Publication Data

US 2003/0056433 A1 Mar. 27, 2003

Related U.S. Application Data

(60) Provisional application No. 60/182,614, filed on Feb. 15, 2000, and provisional application No. 60/228,715, filed on Aug. 29, 2000.

(51) Int. Cl.[7] .................................................. A01G 7/00
(52) U.S. Cl. ............................................................. 47/9
(58) Field of Search ................................................. 47/9

(56) References Cited

U.S. PATENT DOCUMENTS

| | | | |
|---|---|---|---|
| 1,971,504 A | 8/1934 | Pratt | 47/56 |
| 2,038,019 A | 4/1936 | Wright | 47/9 |
| 3,274,731 A | 9/1966 | Vigneault | 47/9 |
| 3,797,690 A | 3/1974 | Taylor | 220/1 R |
| 3,810,328 A | 5/1974 | Bryan, Jr. | 47/9 |
| 3,901,838 A | 8/1975 | Clendinning | 260/23 H |
| 3,938,280 A | 2/1976 | Vandemark | 47/9 |
| 3,939,606 A | 2/1976 | Vandemark | 47/9 |
| 3,949,145 A | 4/1976 | Otey | 428/423 |
| 4,282,682 A | 8/1981 | Dalens | 47/9 |
| 4,302,241 A | * 11/1981 | Levitt | 504/212 |
| 4,519,161 A | 5/1985 | Gilead | 47/9 |
| 4,538,531 A | 9/1985 | Wong | 111/1 |
| 4,782,626 A | 11/1988 | Shanley | 47/9 |
| 5,096,941 A | 3/1992 | Harnden | 523/126 |
| 5,163,247 A | 11/1992 | Weber | 47/9 |
| 5,191,734 A | 3/1993 | Weber | 47/9 |
| 5,292,783 A | 3/1994 | Buchanan | 524/37 |
| 5,446,079 A | 8/1995 | Buchanan | 524/41 |
| 5,532,298 A | 7/1996 | Monroe | 524/13 |
| 5,580,911 A | 12/1996 | Buchanan | 524/41 |
| 5,585,150 A | 12/1996 | Sheehan | 428/15 |
| 5,599,858 A | 2/1997 | Buchanan | 524/41 |
| 5,672,434 A | 9/1997 | Dalebroux | 428/537.5 |
| 5,853,541 A | 12/1998 | Monroe | 162/141 |
| 5,863,991 A | 1/1999 | Warzelhan | 525/426 |
| 5,866,269 A | 2/1999 | Dalebroux | 428/537.5 |
| 5,880,220 A | 3/1999 | Warzelhan | 525/424 |
| 5,889,135 A | 3/1999 | Warzelhan | 528/176 |
| 5,900,322 A | 5/1999 | Buchanan | 428/480 |
| 5,934,011 A | 8/1999 | Ishioka | 47/1.01 |

(List continued on next page.)

*Primary Examiner*—Charles T. Jordan
*Assistant Examiner*—Son T. Nguyen
(74) *Attorney, Agent, or Firm*—Ostrager Chong & Flaherty LLP

(57) ABSTRACT

A substrate comprising a paper layer and at least one biodegradable polymer layer extruded thereon is provided. The paper layer may have an extruded polymer layer on each side, it may have multiple polymer layers extruded on one side, or both. Additives appropriate for the particular use of the substrate may be added to one or more of the polymer layers.

24 Claims, 3 Drawing Sheets

U.S. PATENT DOCUMENTS

| | | | |
|---|---|---|---|
| 5,936,045 A | 8/1999 | Warzelhan | 525/437 |
| 6,018,004 A | 1/2000 | Warzelhan | 525/440 |
| 6,021,598 A | 2/2000 | Holton | |
| 6,029,395 A | 2/2000 | Morgan | 47/9 |
| 6,033,747 A | 3/2000 | Shiotani | 428/34.3 |
| 6,040,063 A | 3/2000 | Doane | 428/532 |
| 6,046,248 A | 4/2000 | Warzelhan | 521/138 |
| 6,103,858 A | 8/2000 | Yamamoto | 528/272 |
| 6,111,058 A | 8/2000 | Warzelhan | 528/332 |
| 6,114,042 A | 9/2000 | Warzelhan | 428/422.8 |
| 6,164,011 A | 12/2000 | Gaudreault | 47/9 |
| 6,339,898 B1 * | 1/2002 | Toye | 47/9 |

\* cited by examiner

BIODEGRADABLE PAPER-BASED AGRICULTURAL SUBSTRATE

PRIORITY CLAIM

This application claims the priority date of, and incorporates by reference, pending U.S. Provisional Patent Application Nos. 60/182,614, which was filed on Feb. 15, 2000 and 60/228,715, which was filed on Aug. 29, 2000.

FIELD OF THE INVENTION

This invention generally relates to agricultural mulches. Specifically, this invention relates to biodegradable agricultural mulches which may remain in the soil after their use.

BACKGROUND OF THE INVENTION

Plastic mulches are widely used in numerous agricultural applications to control weeds, retain moisture in the soil and increase soil temperature to facilitate plant growth and to increase crop quality and yield.

Desirable characteristic for a mulch include having sufficient mechanical strength so that they may be used in commercial farming operations with heavy duty equipment, resistance to stresses caused by weather (rain, sun, wind, etc.), puncture resistance to growing weeds, sufficient wet strength, moisture retention and ultraviolet light absorption. It is also important that standard agricultural equipment be able to till the mulch into the soil at the end of the growing season so that the mulch need not be removed in a separate and expensive operation.

A wide variety of mulch products have been developed in an attempt to meet the above requirements. Traditionally, agricultural mulch films have been predominantly comprised of either low or high density polyethylene because they are relatively inexpensive and more resistant to severe weather conditions than other materials. However, these materials are not considered biodegradable and must be removed and land filled at the end of the growing season.

To address the biodegradability problem some conventional mulches are made from paper. However, paper generally degrades too quickly, does not retain sufficient ground moisture or lacks sufficient strength to be used in commercial agricultural operations. Coating paper with various compounds such as polyethylene, polypropylene, or polyvinyl chloride, polyvinyldene chloride, styrene butadiene, carboxylated styrene butadiene, carboxylated acrylonitrile butadiene, and natural rubber latex may increase its strength and slow its degradation rate. However, the coating must be completely biodegradable and incorporate all of the features discussed above for the paper/coating substrate to function as a useful agricultural mulch.

U.S. Pat. Nos. 3,810,328, 3,938,280 and 3,939,606 disclose paper-based mulches with coatings that include organic resin or plastic coatings such as polyethylene, polypropylene, polyvinyl chloride, wax-based coatings, polyvinyl acetate, Saran or similar coatings.

U.S. Pat. Nos. 4,782,626, 5,163,247, 5,672,434 and 5,866,269, disclose paper or cellulose fiber mulches with latex coatings or related methods.

U.S. Pat. Nos. 5,532,298 and 5,853,541 disclose agricultural mulches made by combining mixtures of linters, pulps and water holdout materials or pulps, polyethylene fibers and, optionally, water holdout materials.

U.S. Pat. No. 5,191,734 discloses a mulch comprised of biodegradable cellulose or synthetic fiber web treated with latex.

U.S. Pat. No. 5,096,941 discloses a degradable composition comprised of polyethylene and cerium stearate which can be made into a film and used as an agricultural mulch.

All of these references concern mulches which may contain non-biodegradable material.

U.S. Pat. No. 5,934,011 discloses a seed mat comprised of a water soluble paper layer, a water absorbing polymer film layer and seeds.

U.S. Pat. No. 6,033,747 discloses the use of various biodegradable polyesters comprised of poly (3-hydroxybuturate-co-3-hydroxyhexanoate) to laminate base materials to form agricultural mulches.

U.S. Pat. No. 6,040,063 discloses biodegradable hydroxy functionalized polyester compounds and mulches made therefrom.

U.S. Pat. Nos. 5,863,991, 5,880,220, 5,889,135, 5,936,045, 6,018,004, 6,046,248, 6,111,058, 6,114,042 and 6,103,858 disclose biodegradable polyester compounds with various applications.

U.S. Pat. Nos. 5,292,783, 5,466,079, 5,580,911, 5,599,858 and 5,900,322 are related cases which disclose various chemical compounds, including polyesters, with various applications.

While a variety of products exist, none possess all of the qualities that are desirable for an agricultural mulch. Thus, there is a need for a truly biodegradable agricultural mulch which will not build up and remain in the soil after tilling and which incorporates the desirable features and characteristics described above.

SUMMARY OF THE INVENTION

The present invention is a paper-based agricultural substrate/mulch, which is biodegradable, has sufficient mechanical strength for commercial operations and retains a sufficient ground moisture. Other advantages include adjustable biodegradation rates and wet strength, resistance to natural stresses, such as weather, and the ability to be tilled or disked into the soil with standard agricultural equipment.

The preferred embodiments, when used in an agricultural application, will eventually degrade to water, $CO_2$ and biomass. This complete biodegradation distinguishes the mulches of the invention from many existing mulches which may break down to small pieces when tilled but biodegrade slowly so that they remain in the soil for several planting seasons.

In accordance with one preferred embodiment of the invention a substrate comprising a paper layer and an extruded biodegradable polymer layer is provided.

In accordance with another preferred embodiment of the invention a substrate comprising a paper layer and a co-extrusion of two or more biodegradable polymer layers on the same side of the paper layer is provided.

In accordance with another preferred embodiment of the invention a substrate comprising a paper layer and at least one extruded biodegradable polymer layer on each side of the paper layer is provided.

In accordance with another preferred embodiment of the invention a substrate comprising a paper layer, at least one polymer layer and various additives in the polymer layer suited to the particular use of the substrate is provided.

DETAILED DESCRIPTION OF THE PREFERRED EMBODIMENTS

Figure 1:
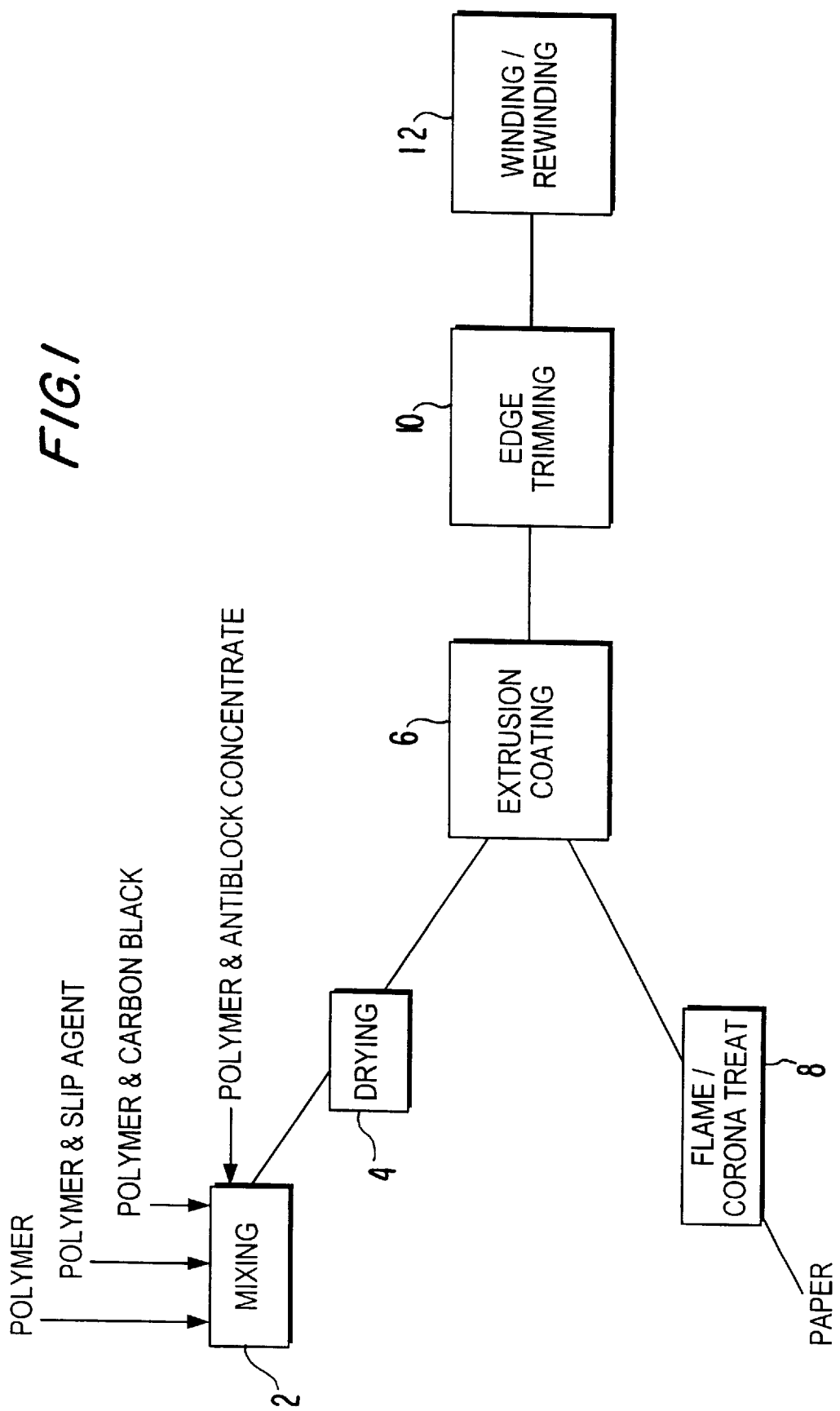
FIG. 1 is a schematic showing the process by which a preferred substrate is produced.

The present invention relates to a biodegradable mulch which has properties which make it particularly suitable for its intended uses.

In a preferred embodiment of the invention, a paper layer is bonded with at least one polymer layer to form a multi-layer substrate. The paper layer helps the mulch maintain a tight fit with the ground, helps the mulch resist penetration by weeds, makes the mulch more opaque (i.e. it blocks the sun from the ground) and it holds moisture. The polymer can be applied as a single layer or as a multi-layer co-extrusion to one or both sides of the paper. In the co-extruded structure the polymer layer, which is bonded to the paper, does not have additives. The outer polymer layer contains slip and/or antiblock additives so that it does not stick to a chill roll on the manufacturing equipment or to itself. The final polymer layer may also contain additives to affect the rate of biodegradation, coloring agents, chemicals to improve soil conditions (e.g. fertilizers), ultraviolet light stabilizers, and printing.

The level of adhesion between the paper layer and polymer layer can be increased from that of single extruded polymer layer by using a two-layer co-extruded polymer layer structure. When one polymer layer is used it will, generally, incorporate additives such as slip agents or antiblock concentrate which will reduce the amount of adhesion between the polymer layer and the paper layer. With two or more polymer layers on the same side of the paper layer the polymer layer making contact with the paper need not have these additives and, therefore, will adhere more strongly to the paper surface.

With decreased bond strength between the paper and polymer, the overall substrate behaves more like a polymer film in its toughness and elasticity. Decreased bond strength also helps to prevent the propagation of cracks and tears in the substrate.

The paper layer increases the opacity to sunlight and impenetrability of the mulch to weeds. Prior art low density polyethylene films, for example, are easily pierced by weeds such as nutsedge. These weeds may have stiff stalks which can grow upward and form a weak area in the film, eventually causing penetration. The paper layer adds stiffness to the structure of the substrate so that weeds cannot penetrate it.

A variety of paper grades including multiwall, super calendered kraft (SCK), extensible kraft, unbleached kraft, bleached grade paper or any paper material providing the appropriate attributes may be used. The paper layer may also contain wet strength agents and/or additional synthetic or natural fibers. It is preferred that the basis weight of the paper be in the range of 15–60 lb./3000 ft.$^2$ (Note: 3000 ft.$^2$ is equivalent to 3MSF), preferably 18–50 lb./3000 ft.$^2$. Generally, the paper should be stiff enough to resist weed penetration while not being so heavy that the substrate is too stiff to be applied with conventional agricultural equipment.

Several different polymer compounds can be used to make the polymer film layer. Two statistical aliphatic and aromatic copolyesters suitable for use in the invention are manufactured by Eastman Chemical Corporation, Kingsport, Tenn. and BASF Aktiengesellschaft, Ludwigshafen, Germany, respectively. Eastman EASTAR® BIO GP is a copolyester resulting from the copolymerization of the monomers 1,4-benzenedicarboxylic acid (terephthalic acid), 1,4-butanediol, and adipic acid. The resulting copolyester is poly(tetramethylene adipate-co-terephthalate). BASF ECOFLEX® is also a copolyester resulting from the copolymerization of 1,4-benzenedicarboxylic acid (terephthalic acid), 1,4-butanediol, and adipic acid with the resulting copolyester being poly(tetramethylene adipate-co-terephthalate) plus a branching agent or a chain extender.

Various other biodegradable resins, such as Cargill-Dow ECOPLA® polylactic acid (Cargill-Dow LLC, Midland, Mich.), Union Carbide TONE® polycaprolactones (Union Carbide Corporation, Houston, Tex.), Dupont BIOMAX® polyester (Dupont Chemical Corporation, Wilmington, Del.), PAC Polymers QPAC25® polyethylene carbonate (PAC Polymers, Inc., Greenville, Del.), extrudable soy proteins, cellulose acetate based polymers and extrudable starches may be used in the invention.

The chemicals listed herein may be used alone or in combination to form a composition which can be extruded as a polymer layer. It is also possible to use two or more polymer layers, each having different chemical compositions, in the same substrate.

Various organic or inorganic fillers, such as lime, clay, cellulose fibers, or others may be added to the polymer composition.

Slip agents may be added to the polymer so that the extruded polymer layer does not stick to the chill roll on the extrusion equipment. If more than one polymer layer is extruded onto the same side of a paper layer only the outer polymer layer will have the slip agent. The slip agent may be premixed with a preferred polymer and may include wax and other agents.

Antiblock concentrate may also be used with or instead of the slip agent. The antiblock concentrate may be premixed with a preferred polymer and may include talc.

Carbon black may also be premixed with the preferred polymers. The carbon black makes the polymer layer darker so that it absorbs more sunlight and heats the ground more efficiently. The carbon black also helps to prevent the sunlight from reaching weeds under the mulch. A preferred amount of carbon black in the polymer layer is about 1–10 wt. %.

Referring to FIG. 1, the pelletized polymer and, depending on the mix, pelletized polymer/slip agent mixture, pelletized polymer/antiblock concentrate and pelletized polymer/carbon black mixtures are physically blended 2 and dried in a forced air oven 4 at 60° C. for at least three hours. In order to avoid polymer degradation the moisture level should be at or below 2 wt %. After drying the polymer composition is sent to a standard extruder 6, melted and extruded onto paper. The Eastman and BASF polymers have a melting point of 110–115° C. (230–302° F.) and a degradation temperature of approximately 270° C. (520° F.). To achieve an adequate melt flow and avoid degradation the temperature settings for the extruder barrel zones and die should be set a 160–250° C. (320–480° F.).

The paper layer is also directed to the extruder after it is treated with flame, corona discharge or a primer 8 so that the paper and polymer layers adhere to each other more strongly. The flame/corona treatments oxidize the surface of the paper so that it is more chemically compatible with the extruded polymer. The heating of the paper from the flame or corona treatment also allows the polymer to more thoroughly penetrate the surface of the paper. If a primer is used it is placed on the paper surface before the polymer is extruded onto it to help "tie" the paper and polymer surfaces together. Better control of the adhesion level is generally achieved with flame or corona treatment. If multiple polymer layers are extruded they will easily adhere to and penetrate each other because of their chemical similarity. As the paper and polymer layers exit the extruder 6 they are strongly adhered to each other.

The preferred level of adhesion between the paper and polymer layers is approximately 50–250 gf. If the adhesion is lower than 50 gf the polymer and paper layers separate easily during exposure to harsh weather in the field. When the adhesion level is above 250 gf the substrate generally begins to have a lower tear strength, i.e. similar to that of the paper layer alone. However, if a heavy polymer layer is used the substrate will maintain a high tear strength even with high adhesion levels.

After exiting the extruder the substrate is trimmed 10 to remove unevenly coated edges and so that the final product is either 3 or 5 feet wide to fit standard agricultural mulch laying equipment. The substrate is then wound 12 into large production rolls and rewound onto 25–100 lb. rolls for use in the field.

Maximum line speeds of 1000 ft/min were achieved for the co-extruded (2 or more polymer layers) substrates, and 900 ft/min speeds were achieved with the monolayer (one polymer layer) paper/polymer substrates.

A preferred mulch will comprise: 75–100 wt % Eastman EASTAR® BIO GP, 0–15 wt % slip additive (1–12 wt % preferred) and 0–10 wt % carbon black (1–7 wt % preferred). Another preferred mulch comprises: 87–100 wt % BASF ECOFLEX®, 0–15 wt % slip agent, 0–12 wt % antiblock concentrate and 0–10% carbon black.

Substrate biodegradation rates may be varied by adjusting the weights of either, or both, the polymer layers and paper layer, i.e. lighter layers generally degrade faster. Further, though generally applied paper side down (in mulches where polymer is extruded onto only one side of the paper layer), these substrates may be applied paper side up, which generally increases the biodegradation rate.

Those familiar with the art can easily adjust variables such as adhesion level, flame and corona treatment levels, process temperatures, line speeds and other variables in order to produce a product with the preferred properties.

Figure 2:
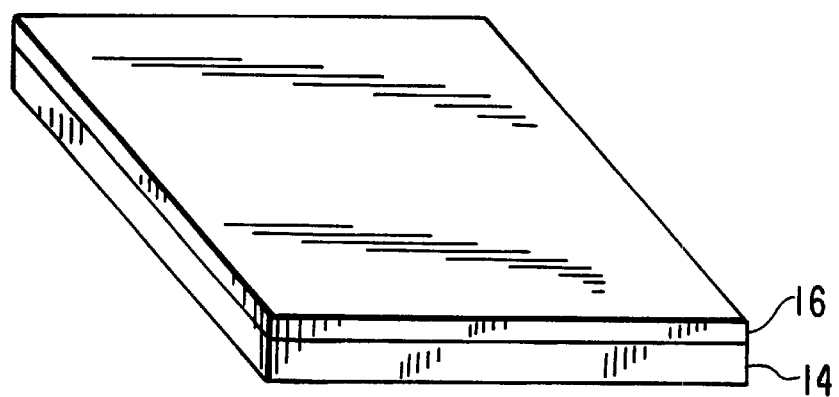
FIG. 2 is a perspective view of a preferred substrate which shows the layers thereof.
Figure 3:
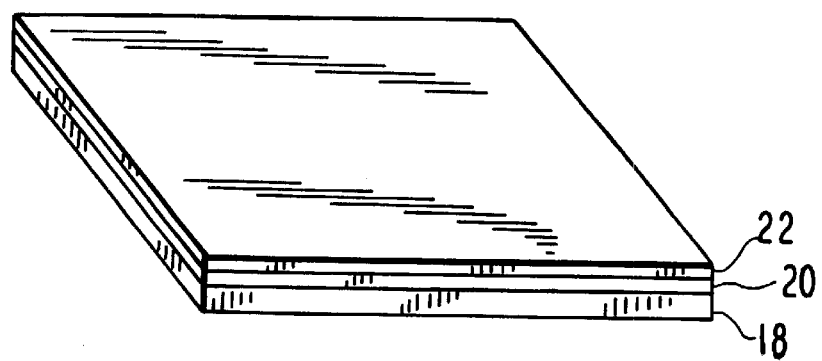
FIG. 3 is a perspective view of another preferred substrate which shows the layers thereof.

One example of a final product mulch is shown in FIGS. 2, which shows the paper layer 14 and the polymer layer 16. In this embodiment layer 16 may include slip agents or antiblock concentrate, carbon black or other additives. FIG. 3 shows an alternative embodiment of the mulch which comprises a paper layer 18, a first polymer layer 20 and a second polymer layer 22. In this embodiment layer 22 may include slip agents or antiblock concentrate, carbon black or other additives, though, generally, layer 20 will not.

The paper layer may also have identifying writing or marks to indicate suggested locations for planting seeds etc. Other alternatives include adding fertilizers, grass seeds, flower seeds, weed controllers, insecticides, fungicides, water retainer chemicals, wave absorbent pigments or color pigments to the outer polymer layer. The mulch may also be prepunched to facilitate planting.

Figure 4:
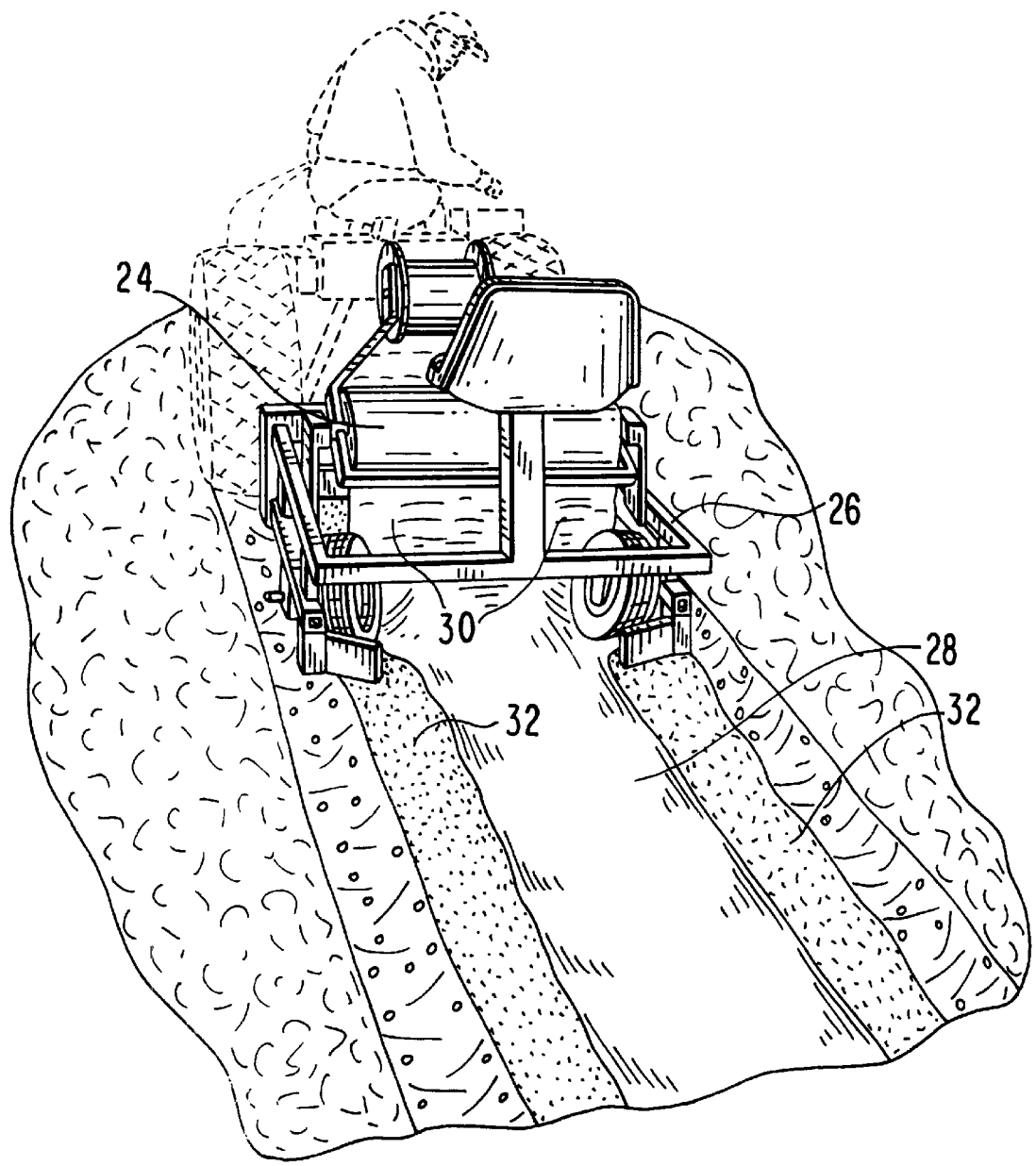
FIG. 4 is a perspective view of the mulch application process.

FIG. 4 shows the mulch being applied in a typical manner. The mulch roll 24 is placed on the mulch laying apparatus 26 and unrolled as the apparatus moves down the field. As the mulch 28 is laid down its edges 30 are covered with soil 32 by the apparatus 26 so that wind cannot get underneath the mulch. The mulch may remain in place during the entire growing season and can be tilled or disked into the soil with standard farming equipment after harvesting. After tilling the mulch will essentially completely biodegrade within several months, generally no longer than 6 months.

EXAMPLES

Sample products were made by the process described above and compared to a 30 lb./3000 ft.$^2$ extensible natural kraft paper and a low density polyethylene (LDPE) plastic film. The results are shown in Table 1:

TABLE 1

|  | Sample A | Sample B | Sample C | Sample D | Sample E | Sample F |
| --- | --- | --- | --- | --- | --- | --- |
| Basis Wt. (lb./3000 ft.$^2$) | 29.7 | 19.7 | 40.0 | 38.8 | 40.0 | 40.0 |
| Caliper (mils) | 3.1 | 1.4 | 3.5 | 3.5 | 3.5 | 3.5 |
| Tensile Strength MD (machine direction) (lb$_F$/in) (pounds force/inch) | 19.1 | 2.7 | 19.4 | 17.1 | 22.6 | 22.1 |
| Tensile Strength CD (cross direction) (lb$_F$/in) | 6.9 | 3.9 | 7.7 | 7.6 | 9.0 | 9.8 |
| Tear Strength, MD (g$_f$) (grams force) | 39.3 | 107.2 | 64.7 | 117.0 | 87.2 | 83.5 |
| Tear Strength, CD (g$_f$) | 57.4 | 66.7 | 98.4 | 164.0 | 82.0 | 87.8 |

Sample A: extensible natural kraft (30 lb./3MSF)
Sample B: black LDPE film (1.4 mil)
Sample C: 5 lb./3MSF ECOFLEX ® with carbon black, slip additive, and antiblock additive: 5 lb./3MSF pure ECOFLEX ®: 30 lb./3MSF natural extensible kraft
Sample D: 10 lb./3MSF ECOFLEX ® with carbon black, slip additive, antiblock additive: 30 lb./3MSF natural extensible kraft
Sample E: 5 lb./3MSF EASTAR ® with carbon black, slip additive: 5 lb. pure EASTAR ®: 30 lb./3MSF natural kraft
Sample F: 10 lb./3MSF EASTAR ® with carbon black, slip additive: 30 lb./3MSF natural kraft As seen in Table 1, the polymer coated samples (samples C–F) had a higher tensile strength in the machine direction and cross direction as compared to the paper sample (sample A). The tensile strength of the paper (sample A) and sample paper/polymer products (samples C–F) were significantly higher than the polyethylene film (sample B). This illustrates the importance of the paper substrate in increasing the stiffness of the mulch.

Addition of polymer layers to the paper layer also increases the tear strength of the paper in both the machine direction and cross direction, as compared to the paper or the LDPE film. This is significant because mulches often tear in the cross direction during while being applied in the field.

Field Tests

From field studies at several major universities, it is evident that the stiffness provided by the paper substrate inhibits piercing by certain weeds, such as nutsedge. The paper layer has also been found to provide enough dimensional stability to prevent the polymer film from expanding in warmer temperatures. This will help the mulch to maintain a tight fit to the soil surface, thus, providing better soil heating than polyethylene films.

Test samples were applied in the field with use of standard agricultural equipment such as that illustrated in FIG. 4. Field tests were performed in several locations so that the substrates were exposed to various environments. For example, samples in Florida were exposed to hot and humid weather, samples in California were exposed to very dry conditions and samples in New Hampshire, New York and Pennsylvania were used to test the early season heating efficiency of the mulch. During the tests, sample substrates with paper layers of 30 lbs./3000 ft.$^2$ Or lighter worked best because the edges of the mulch did not curl. Curling may keep the mulch from laying tightly against the ground and may reduce heating efficiency.

Table 2 represents the results of several tests of the mulch versus a typical black low density polyethylene film. The average change in temperature at 2 in. and 4 in. depth with each mulch is compared to results for the bare ground.

TABLE 2

Average Temperature Change (° F.) vs. Bare Ground at 2" and 4" Soil Depth

| Sample | Temp. Change (2") | Temp. Change (4") |
|---|---|---|
| Black Film (average) | 10.5 | 5.5 |
| ECOFLEX ® coated structure | 8.0 | 4.0 |

The results show that the heating efficiency of the paper/polymer substrate is very similar to that of the black LDPE film.

Table 3 shows the results of tests wherein the yield of bell peppers was measured. The data represents the averages of each variable. Three plots were planted for each variable. Each plot had dimensions of approximately 12 ft. by 2 ft. The plants were placed at 1.5 ft. intervals.

TABLE 3

| Sample | Yield (Green Fruit) lbs. per plot | Yield (Red Fruit) lbs. per plot | Total Yield lbs. per plot |
|---|---|---|---|
| Sample G | 30.8 | 5.0 | 35.8 |
| Sample H | 34.9 | 4.4 | 39.3 |

Sample G: 10 lb./3MSF ECOFLEX ® with carbon black, slip additive, antiblock additive: 30 lb./3MSF natural extensible kraft
Sample H: 10 lb./3MSF ECOFLEX ® with carbon black, slip additive, antiblock additive: 40 lb./3MSF natural multiwall kraft The complete growing season was 4–5 months. The testing period, from mulch application to tilling, was 5 months. The paper/polymer substrate partially degraded during the growing season, e.g. the polymer layer began to embrittle and chip. Under similar conditions, i.e. alternating exposure to rain and sunshine, paper alone probably would have degraded significantly in only two weeks.

At the end of the season the samples were disked/tilled into the soil with standard rotatillers and plowing equipment. Most of the substrate was chopped into very small pieces. After a few days there was no visible evidence of the substrate in the field.

The invention has numerous applications in both large commercial and small agricultural operations. While the invention has been described with reference to preferred embodiments, it will be understood by those skilled in the art that various changes may be made and equivalents may be substituted for elements thereof without departing from the scope of the invention. For example, various polymer blends or composites could be used in the invention.

Further, it should be understood that, in general, the extrusion process for polymer films is known and many variables can be adjusted by those familiar with the art.

In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An agricultural mulch comprised of: a first polymer layer extruded onto a first side of a paper layer, the first polymer layer comprising the product of the copolymerization of 1,4-benzenedicarboxylic acid, 1,4-butanediol, and adipic acid.

2. The agricultural mulch of claim 1, further comprising a second polymer layer extruded onto a second side of the paper layer.

3. The agricultural mulch of claim 1, wherein the first polymer layer further comprises a slip agent and/or antiblock composition.

4. The agricultural mulch of claim 1, wherein the paper layer is a paper selected from the group consisting of multiwall paper, super calendered kraft paper, extensible kraft paper, unbleached kraft paper and bleached grade paper.

5. The agricultural mulch of claim 1, wherein the weight of the paper layer is 15 to 60 lb./3000 ft$^2$.

6. The agricultural mulch of claim 1, wherein the weight of the first polymer layer is 2–30 lb./3000 ft.$^2$.

7. The agricultural mulch of claim 1, wherein the first polymer layer further comprises an organic or inorganic material selected from the group consisting of carbon black, fertilizer, flower seeds, grass seeds, lime, clay and cellulose fibers.

8. An agricultural mulch comprised of: a first polymer layer extruded onto a first side of a paper layer, the first polymer layer comprising the product of the copolymerization of 1,4-benzenedicarboxylic acid, 1,4-butanediol, and adipic acid and a second polymer layer extruded onto the first polymer layer.

9. The agricultural mulch of claim 8, further comprising a third polymer layer extruded onto a second side of the paper layer.

10. The agricultural mulch of claim 9, further comprising a fourth polymer layer extruded onto the third polymer layer.

11. The agricultural mulch of claim 8, wherein the second polymer layer further comprises a slip agent and/or antiblock composition.

12. The agricultural mulch of claim 8, wherein the paper layer is a paper selected from the group consisting of multiwall paper, super calendered kraft paper, extensible kraft paper, unbleached kraft paper and bleached grade paper.

13. The agricultural mulch of claim 8, wherein the weight of the paper layer is 15 to 60 lb./3000 ft$^2$.

14. The agricultural mulch of claim 8, wherein the combined weight of the first and second polymer layers is 2–30 lb./3000 ft.$^2$.

15. The agricultural mulch of claim 8, wherein the second polymer layer further comprises an organic or inorganic material selected from the group consisting of carbon black, fertilizer, flower seeds, grass seeds, lime, clay and cellulose fibers.

16. A method for manufacturing an agricultural mulch comprising:
(a) preparing a paper layer;
(b) preparing a first polymer layer, the polymer layer being a product of a copolymerization of 1,4-benzenedicarboxylic acid, 1,4-butanediol and adipic acid; and
(c) extruding the first polymer layer onto a first side of the paper layer.

17. The method of claim 16, further comprising:
extruding a second polymer layer onto the first polymer layer.

18. The method of claim 17, further comprising:
extruding a third polymer layer onto a second side of the paper layer.

19. The method of claim 18, further comprising:
extruding a fourth polymer layer onto the third polymer layer.

20. The method of claim 17, further comprising:
adding an organic or inorganic material to the second polymer layer, the material being selected from the group consisting of carbon black, fertilizer, grass seeds, flower seeds, lime, clay and cellulose fibers.

21. The method of claim 17, further comprising:
adding a slip agent and/or antiblock composition to the second polymer layer.

22. The method of claim 16, further comprising:
extruding a second polymer layer onto a second side of the paper layer.

23. The method of claim 16, further comprising:
adding an organic or inorganic material to the first polymer layer, the material being selected from the group consisting of carbon black, fertilizer, grass seeds, flower seeds, lime, clay and cellulose fibers.

24. The method of claim 16, further comprising:
adding a slip agent and/or antiblock composition to the first polymer layer.

* * * * *